United States Patent
LaBlanc et al.

(10) Patent No.: US 10,190,034 B2
(45) Date of Patent: Jan. 29, 2019

(54) NON-REDUCING STABILIZATION COMPLEXANT FOR ACIDIZING COMPOSITIONS AND ASSOCIATED METHODS

(71) Applicant: Halliburton Energy Services, Inc., Houston, TX (US)

(72) Inventors: Benjamin Edward LaBlanc, Humble, TX (US); Enrique Antonio Reyes, Tomball, TX (US); Alyssa Lynn Smith, Humble, TX (US); Aaron Michael Beuterbaugh, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 85 days.

(21) Appl. No.: 15/308,937

(22) PCT Filed: Sep. 30, 2014

(86) PCT No.: PCT/US2014/058218
§ 371 (c)(1),
(2) Date: Nov. 4, 2016

(87) PCT Pub. No.: WO2016/053280
PCT Pub. Date: Apr. 7, 2016

(65) Prior Publication Data
US 2017/0066957 A1    Mar. 9, 2017

(51) Int. Cl.
*C09K 8/524* (2006.01)
*C09K 8/56* (2006.01)
(Continued)

(52) U.S. Cl.
CPC .............. *C09K 8/524* (2013.01); *C09K 8/035* (2013.01); *C09K 8/528* (2013.01); *C09K 8/56* (2013.01); *C09K 8/72* (2013.01); *C09K 8/86* (2013.01)

(58) Field of Classification Search
None
See application file for complete search history.

(56) References Cited

U.S. PATENT DOCUMENTS

| 3,083,158 A | 3/1963 | Markham |
| 4,663,059 A | 5/1987 | Ford et al. |

(Continued)

FOREIGN PATENT DOCUMENTS

WO    WO 2014164835 A1    10/2014

OTHER PUBLICATIONS

International Search Report and Written Opinion for International Application No. PCT/US2014/58218 dated May 28, 2015. (12 pages).

(Continued)

*Primary Examiner* — Jeffrey D Washville
(74) *Attorney, Agent, or Firm* — Haynes and Boone, LLP (57) ABSTRACT

Methods for reducing viscosifying tendencies of crude oil in subterranean formations using solid acid chelating agents are described. The methods include combining a solid acid chelating agent and an aqueous acid solution to form a treatment fluid, and introducing the treatment fluid into the subterranean formation. The solid acid chelating agent includes at least one aminopolycarboxylic acid functional group and at least one phosphonic acid functional group.

12 Claims, 2 Drawing Sheets

(51) Int. Cl.
*C09K 8/86* (2006.01)
*C09K 8/528* (2006.01)
*C09K 8/035* (2006.01)
*C09K 8/72* (2006.01)

(56) References Cited

U.S. PATENT DOCUMENTS

| | | | |
|---|---|---|---|
| 4,823,874 A | 4/1989 | Ford | |
| 4,981,601 A | 1/1991 | Ford | |
| 5,019,343 A * | 5/1991 | Hwa | C02F 5/14 |
| | | | 252/387 |
| 5,409,614 A * | 4/1995 | Gallup | C02F 1/042 |
| | | | 210/700 |
| 6,132,619 A | 10/2000 | Lin et al. | |
| 6,402,934 B1 | 6/2002 | Chheda et al. | |
| 8,003,581 B1 | 8/2011 | Vinson et al. | |
| 2010/0276152 A1 * | 11/2010 | De Wolf | C09K 8/74 |
| | | | 166/308.2 |
| 2011/0168395 A1 | 7/2011 | Welton et al. | |
| 2015/0322329 A1 | 11/2015 | Reyes et al. | |

OTHER PUBLICATIONS

Fred et al., "Alternative stimulation fluids and their impact on carbonate acidizing," SPE Journal, Mar. 1998, pp. 34-41.

Jones et al., "Novel Chemistry Eliminates Post-Cleanup of Obm Filter Cakes," European Formation Damage Conference, Jan. 2007, pp. 1-15, Society of Petroleum Engineers, Scheveningen, The Netherlands.

O'Neil et al., "Prevention of acid-induced asphaltene precipitation: a comparison of anionic vs. cationic surfactants," Journal of Canadian Petroleum Technology, Jan. 2015, pp. 49-62.

Resources Taylor et al.,"Acidizing-lessons from the past and new opportunities," SPE Canadian Unconventional Conference, Oct.-Nov. 2012, pp. 1-13, Society of Petroleum Engineers, Calgary, Alberta, Canada.

* cited by examiner

NON-REDUCING STABILIZATION COMPLEXANT FOR ACIDIZING COMPOSITIONS AND ASSOCIATED METHODS

BACKGROUND

The present invention relates generally to methods for treating a subterranean formation with a solid acid chelating agent.

Subterranean formations from which oil and/or gas can be recovered can contain several solid materials contained in porous or fractured rock formations. The naturally occurring hydrocarbons, such as oil and/or gas, are trapped by the overlying rock formations with lower permeability. The reservoirs are found using hydrocarbon exploration methods and often one of the treatments needed to withdraw the oil and/or gas therefrom is to improve the permeability of the formations. The rock formations can be distinguished by their major components.

One process to make formations like carbonate or sandstone formations more permeable is an acid fracturing process, wherein an acidic fluid is introduced into the formations trapping the oil and/or gas under a pressure that is high enough to fracture the rock, the acidic fluid meanwhile or afterwards dissolving the carbonate so that the fracture does not fully close anymore once the pressure is released again. In carbonate formations, the goal is usually to have the acid dissolve the carbonate rock to form highly-conductive fluid flow channels, which are called wormholes, in the formation rock usually under flow injection regimes that are not conducive to the fracturing of the rock, also known as matrix acidizing.

In acidizing a carbonate, dolomite, or a combination thereof formation, calcium and magnesium carbonates of the rock can be dissolved with acid. A reaction between an acid and the minerals calcite ($CaCO_3$) or dolomite ($CaMg(CO_3)_2$) can enhance the fluid flow properties of the rock.

Common acids such as hydrochloric acid (HCl), acetic acid, and formic acid are typically used in acidizing. These acids, however, can have adverse effects when certain downhole well conditions are encountered. Typical problems occur when the wells reach an elevated temperature, which leads to near well-bore (NWB) spending and increased corrosion.

NWB spending leads to the need for increased volumes of acid to achieve penetration into the formation. Moreover, as temperatures increase, the acids exhibit increased reactivity with the formation such that NWB spending or softening of the formation leads to wellbore or NWB collapse or other adverse failures.

Corrosion is also a major factor when elevated temperatures are encountered in downhole conditions. As temperatures increase, acids can be inhibited with large acid inhibitor concentration loadings, which can lead to formation damage or fluid instability. In many instances, such as at temperatures above 350° F., common acids cannot be inhibited. In other instances, highly sensitive metallurgical components and completions (such as low carbon steel, chrome-type steels, and molybdenum-containing alloys like coiled tubing) are employed that restrict the use of HCl acid fluids.

Another problem encountered with acid treatment is the formation of sludge. HCl, particularly when at high concentrations of about 15% and greater, can cause the development of sludge when the acid is placed in contact with certain types of crude oil. The sludge formation problem is exacerbated when the acid that is in contact with the crude oil also contains ferric ion.

Certain crude oils contained in subterranean formations produce sludge upon contact with aqueous acid solutions during the carrying out of acidizing treatments. The sludge formed is an asphalt-like material which precipitates in the formations and often plugs or clogs the enlarged flow channels formed therein. Interaction studies between sludging crude oils and acids have shown that precipitated solids or films are formed at the acid oil interface. The precipitates are mainly asphaltenes, resins, paraffins and other high-molecular weight hydrocarbons.

When sludges are produced in crude oil, the viscosity of the oil drastically increases. Due to this increase, the rheological characteristics of the fluid can exhibit negative effects by a dramatic decrease in formation fluid-drainage properties. The treated formations are very slow to clean up, if at all, and often the acidizing treatments produce a decrease in permeability and reduction in oil production instead of an increase.

Another common cause of production declining in a mature hydrocarbon well is fouling of the perforations in the well casing and the structure of the formation around the well with scale precipitated from brine. These precipitations are known to form near the wellbore, inside casing, tubing, pipes, pumps and valves, and around heating coils. Reduction of near wellbore permeability, perforation tunnel diameter, production tubing diameter, and propped fracture conductivities can significantly reduce well productivity. Over time, large scale deposits can reduce fluid flow and heat transfer as well as promote corrosion and bacterial growth. As the deposits grow, the production rate decreases and even the whole operation could be forced to halt.

The production may be revived, at least partially, with a stimulation technique. One commonly used technique is hydraulic fracturing. In the process of hydraulic fracturing, a fracturing fluid is injected at high pressure into a subterranean formation to create artificial cracks in the subterranean formation. A proppant added to the fracturing fluid fills the fractures to maintain the openings created by the crack. Although the fracture exposes new rock and breaks scale, once the fracture has been made and hydrocarbon production resumed, the well and the adjacent subterranean formation are still subject to scaling from precipitating minerals from subterranean brines, for example, calcium sulfate and calcium carbonate.

Removal of scales often requires expensive well interventions involving bullhead or coil tubing placement of scale dissolving chemical treatments, milling operations or re-perforation. Economically efficient scale management predominantly involves the application of chemical scale inhibitors that prevent scale deposition. Scale inhibitors are conventionally applied as downhole injections or squeeze treatments. Since hydraulic fracturing is costly, sometimes costing as much as drilling the well in the first place, it is necessary that future build-up of scale be prevented as much as possible.

Thus, there is a continuing need for improved methods and compositions for treating subterranean formations. Specifically, there is a need for improved methods and compositions for acidizing in oil and gas operations. In particular, there is a need to control how fast the acid reacts and where in the formation the acid reacts. In addition, there is a need for reducing the formation of sludge in oil and gas operations and inhibiting the formation of scale in subterranean formations.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

According to several exemplary embodiments, methods are provided for treating subterranean formations using a solid acid chelating agent. Such treatment operations can include, for example, drilling operations, stimulation operations, production operations, remediation operations, sand control treatments, and the like. As used herein, "treat," "treatment," and "treating" refer to any subterranean operation that uses a fluid in conjunction with achieving a desired function and/or for a desired purpose. More specific examples of treatment operations include drilling operations, fracturing operations, gravel packing operations, acidizing operations, scale dissolution and removal operations, sand control operations, consolidation operations, anti-sludge operations, and the like.

According to several exemplary embodiments, a method is provided for acidizing a subterranean formation using a solid acid chelating agent. The solid acid chelating agent has the ability to dissolve carbonate minerals from rock surfaces and differentially etch conductive patterns on the surfaces to enhance fluid migration and flow, thereby facilitating resource recovery.

According to several exemplary embodiments, a method is provided for inhibiting scale formation in a subterranean formation using a solid acid chelating agent. The solid acid chelating agent can be placed in a gelled or slick water fluid for use in a hydraulic fracturing operation. As used herein, "scale" refers to a mineral or solid salt deposit that forms when the saturation of formation water to one or more minerals is affected by changing physical conditions (such as temperature, pressure, or composition), thus causing minerals and salts previously in solution to precipitate into solids.

According to several exemplary embodiments, a method is provided for reducing viscosifying tendencies of crude oil in a subterranean formation using a solid acid chelating agent. The solid acid chelating agent can provide both oil-sludging reduction and iron sequestration when added to aqueous acid solutions. The solid acid chelating agent, when ionized, binds to iron, thereby decreasing the propensity for sludging. When the chelating agent binds to iron, it allows the oil in a reservoir to flow freely to the wellbore.

Chelating agents (also known as ligands or chelants) are materials that are employed to control undesirable reactions of dissolved metal ions. In oilfield chemical treatments, chelating agents are frequently added to matrix stimulations to prevent precipitation of total dissolved solids. In addition, chelating agents are used as components in many scale removal/prevention formulations. Chelating agents form complexes with metal ions by forming coordinate bonds with the metal ion. Chelating agents sequester and inactivate the metal ion so it does not easily react with other elements or ions to produce precipitates or scale. Chelating agents can also dissolve scale (e.g., calcium carbonate, magnesium carbonate, dolomite, and iron carbonate). Known chelating agents include polycarboxylic acids, phosphonates, and aminophosphonates.

According to several exemplary embodiments, the solid acid chelating agent includes at least one aminopolycarboxylic acid functional group and at least one phosphonic acid functional group. In several exemplary embodiments, the solid acid chelating agents consists of at least one aminopolycarboxylic acid functional group and at least one phosphonic acid functional group. Without being bound by theory, it is believed that the aminopolycarboxylic acid functional group and phosphonic acid functional group bind to metal ions upon deprotonation. According to several exemplary embodiments, the solid acid chelating agent includes N-phosphonomethyl iminodiacetic acid (PMIDA), which has the structure of Formula I below.

Formula I

PMIDA is an agrochemical precursor and is mainly used as an intermediate to produce the broad-spectrum herbicide glyphosphate.

According to several exemplary embodiments, the solid acid chelating agent, when deprotonized (ionized), chelates metal ions. Illustrative sources of the metal ion may include, for example, treatment fluids (e.g., drilling fluids), leak-off additives, a native carbonate mineral present in the subterranean formation, a non-native carbonate material that was previously introduced to the subterranean formation (e.g., calcium carbonate particles), metal ions being leached into the subterranean formation through corrosion of a drilling tool or wellbore pipe, for example, or a combination thereof. Illustrative metal ions that may be present in a subterranean formation due to dissolution of a carbonate mineral may include, but are not limited to, calcium ions, magnesium ions, iron ions, aluminum ions, barium ions, strontium ions, copper ions, zinc ions, manganese ions, and any combination thereof. Illustrative metal ions that may be present in a subterranean formation due to corrosion may include, but are not limited to, iron ions, or any other metal ion resulting from the dissolution of iron alloys (carbon-steels) by an acid; such as high chrome or nickel alloys (i.e., chrome alloys, duplexes, including superduplex, etc).

The deposition of scale can occur in the transport of aqueous mixtures and in subterranean rock formations due to the presence of water bearing alkaline earth metal cations such as calcium, barium, magnesium, strontium, other divalent ions such as iron, zinc, lead, and manganese, trivalent ions such as iron, aluminum, and chromium and the like as well as the presence of anions such as phosphates, sulfates, carbonates, silicates and the like. When these ions are present in sufficient concentrations, a precipitate can form that builds up on interior surfaces of the conduits used for transport or in the subterranean rock formations, which restrict flow of the media of interest, e.g., water or oil. In oilfield applications, scales that are commonly formed include calcium sulfate, barium sulfate, and/or calcium carbonate. Such scales are generally formed in the fresh waters or brines used in well stimulation and the like as a result of increases in the concentrations of these particular ions, the water pH, pressures, and temperatures. If iron is not controlled, it can precipitate insoluble products, such as ferric hydroxide, and in sour environments, ferrous sulfide. The presence of dissolved iron can also promote sludge formation, especially if asphaltenes are present in the crude oil. Iron in an acid/oil blend dramatically affects the properties of the blend and can make the mixture solidify, which reduces the quality and the ease of pumping and reservoir drainage.

Dissolved iron can originate from contaminated acid, dissolution of rust in the coiled tubing or well casing or tubular, acid corrosion of steel, dissolution of iron-containing minerals in the formation (e.g., chlorite, hematite, and ankerite), corrosion products present in the wellbore, or corroded surface equipment used during an acid treatment. Iron can come in contact with liquid hydrocarbons via exposure to stimulation treatment fluids (e.g., acidizing, cross-linked viscosifying gels), or via exposure to produced waters mixed with fresh water due to the massive volume of water required to conduct hydraulic fracturing treatments.

According to several exemplary embodiments, the metal ion being complexed by the chelating agent may include, for example, a calcium ion, a magnesium ion, an iron ion, and any combination thereof. The metal ion may be complexed with the chelating agent through a direct interaction of the chelating agent with a surface in the subterranean formation (i.e., a carbonate mineral surface), or the metal ion may be complexed by the chelating agent when the metal ion is in solution.

According to several exemplary embodiments, the solid acid chelating agent binds to metal cations (e.g., alkaline earth metals) commonly associated with acidizing-matrix stimulation such as magnesium ($Mg^{2+}$), calcium ($Ca^{2+}$), strontium ($Sr^{2+}$), barium ($Ba^{2+}$), iron ($Fe^{2+}$ and $Fe^{3+}$), and chromium ($Cr^{2+}$, $Cr^{3+}$ and $Cr^{6+}$) to form stable water-soluble complexes. Binding the metal cations results in reduced, minimized, or eliminated secondary or tertiary reactions, as well as reduction, minimization, or elimination of insoluble products that may lead to precipitation and formation damage.

Table 1 lists stability constants for various metal complexes with PMIDA.

TABLE 1

| Cation | Log Stability Constant at 20° C. |
|---|---|
| Mg(II) | 6.28 |
| Ca(II) | 7.18 |
| Sr(II) | 5.59 |
| Ba(II) | 5.35 |

According to several exemplary embodiments, the solid acid chelating agent advantageously has very acidic protons. The pKa values for PMIDA, for example, are about 2.0, 2.3, 5.6, and 10.8. The protons are not tightly held by the chelating agent and are more easily released in solution, even at low pH. The first two pKa values of PMIDA are substantially lower than known chelating agents, such as glutamic acid diacetic acid (GLDA) (pKa values of about 2.6 and about 3.5), methylglycine diacetic acid (MGDA) (pKa values of about 1.6, 2.5, and 10.5), or even ethylenediaminetetraacetic acid (EDTA) (pKa values of about 2.0, 2.7, 6.2, 10.3). Low pKa values are a desired characteristic because they lead to deprotonation of the solid acid chelating agent even at low pH. The deprotonated chelating agent can therefore stabilize released metal cations even at low pH, thus extending the acidity range over which the chelating agent is active. This is an advantage when compared to traditional chelating agents such as EDTA and N-(hydroxyethyl)-ethylenediaminetriacetic acid (HEDTA), which typically chelate better at higher pHs. In addition, the ability to use lower pH values for a treatment fluid in an acidizing operation may enhance the erosion of the formation matrix, thus increasing the effectiveness of the acidizing treatment.

Advantageously, the solid acid chelating agent is more stable at higher temperatures than its aminopolycarboxylic acid counterparts, which facilitates treatment of formations with bottomhole temperatures in excess of 115° F., and in several exemplary embodiments, in excess of 350° F. For example, PMIDA decomposes (neat) at 419° F. This molecular stability is preferable in such conditions since the molecule can be subjected to higher temperatures for longer periods of time.

Yet another advantage is that the solid acid chelating agent has low solubility in water and in aqueous fluid at a pH less than 3.5, which makes it highly suitable for slow released acidizing, allowing deeper active component placement and penetration within a fracture. For example, PMIDA is less than 1% soluble at room temperature. With increasing temperatures, however, PMIDA fully dissolves. This results in very low corrosion on the surface, which mitigates the need to protect surface equipment with large volumes of corrosion inhibitor.

According to several exemplary embodiments, the solid acid chelating agent is capable of operating in high solid content brine, such as high total dissolved solids (TDS) produced waters, where traditional scale inhibitors do not function effectively, and the produced water has to be mixed (or cut) with fresh water. Thus, the solid acid chelating agent is highly tolerant to difficult brines in operations requiring large water volumes, such as unconventional reservoirs. The solid acid chelating agent can be mixed into high TDS brines without requiring mixing or diluting with a fresh water source to abate scale formation in the treatment fluid. The concentration of TDS in these brines can be up to and in excess of 250,000 ppm. In several exemplary embodiments, the brine has a TDS content of greater than 60,000 mg/L.

According to several exemplary embodiments, placement of the solid acid chelating agent in the formation can be tailored to formation conditions, specifically temperature. The solubility of the chelating agent determines the release profile of the chelating agent, and this determines the longevity of the scale protection period. Because the chelating agent is in solid form, rather than liquid form, configurable dispersion or dissolution time for the chelating agent is allowed.

Advantageously, the solid acid chelating agent, on its own, can be used to treat subterranean formations in a variety of ways. Traditionally, a combination of chemicals would be needed. The solid acid chelating agent can be used to reduce sludging problems in crude oil, as well as sequester iron in acid blends. Moreover, the solid acid chelating agent has dissolving capabilities (e.g., calcite and gypsum) and is compatible with crude oil. According to several exemplary embodiments, the solid acid chelating agent is uncoated and can be used in acidizing and/or scale control operations. The solid acid chelating agent can also be blended with a proppant or in a linear gel.

Further, the solid acid chelating agent can be supplied as a solid, which is advantageous when considering transportation logistics, as well as lowered Health, Safety, and Environment (HSE) ratings associated with shipping and handling. The solid acid chelating agent reduces hazards of shipping and negative health and safety aspects associated with personnel handling the chelating agent.

Moreover, the solid acid chelating agent can be delivered in the fully protonated form, therefore eliminating the need to acidify to the desired pH with an additional acid (e.g., HCl), as is the case with the majority of commercially available chelating agents. Because there is no need to acidify with HCl, cost is decreased.

Scale inhibitors may be coated with a hydrophobic layer to delay action of the scale inhibitors. According to several exemplary embodiments, the solid acid chelating agent is uncoated, which lowers costs associated with its manufacturing. Moreover, the chelating agent does not produce a residue after dissolution because there is no extraneous binder, coating agent, or encapsulating agent.

According to several exemplary embodiments, methods of treating a subterranean formation include providing a treatment fluid containing a solid acid chelating agent, wherein the solid acid chelating agent includes PMIDA, and introducing the treatment fluid into the subterranean formation.

According to several exemplary embodiments, the treatment fluids further include any number of additives that are commonly used in treatment fluids including, for example, surfactants, anti-oxidants, polymer degradation prevention additives, relative permeability modifiers, foaming agents, defoaming agents, antifoaming agents, emulsifying agents, de-emulsifying agents, proppants or other particulates, salts, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, and the like. Combinations of these additives can be used as well. In several exemplary embodiments, the treatment fluids require much lower amounts of—and sometimes can even do without—certain additives, such as antisludge additives, fluid loss additives, clay stabilizers, viscosifiers, and thickeners. In several exemplary embodiments, the treatment fluid is substantially free of antisludge additives, iron control agents, scale inhibitors, and corrosion inhibitors. In several exemplary embodiments, the treatment fluid is entirely free of a hydrofluoric acid (HF) generating source.

According to several exemplary embodiments, the treatment fluid includes an aqueous fluid. Suitable aqueous fluids may include, for example, fresh water, salt water, seawater, brine (e.g., a saturated salt solution), or an aqueous salt solution (e.g., a non-saturated salt solution). Aqueous fluids can be obtained from any suitable source. The solid acid chelating agent is salt tolerant and in several exemplary embodiments, does not include sodium, which allows the solid acid chelating agent to be prepared with any suitable brine.

When the treatment fluid is introduced into the formation, the solid acid chelating agent stays solid in the treatment fluid and is insoluble in the treatment fluid at low temperatures for a certain period of time. Thus, the treatment fluid is not sufficiently acidic to react with the first formation material it comes into contact with. As the treatment fluid is carried farther into the formation, temperatures increase and the chelating agent begins to dissolve in the treatment fluid.

According to several exemplary embodiments, the delayed solubilization allows the solid acid chelating agent to deposit onto the surfaces of the formation and solubilize. As the chelating agent solubilizes, it is able to dissolve carbonate in the formation and form soluble complexes with the metal cations (e.g., metal cations released from the carbonate and metal cations in solution) to, for example, provide scale and/or sludge inhibition over time.

Acidizing Operations

According to several exemplary embodiments, the method of acidizing a subterranean formation includes providing a treatment fluid containing a solid acid chelating agent, wherein the solid acid chelating agent includes PMIDA, and introducing the treatment fluid into the subterranean formation. In exemplary embodiments, the subterranean formation is a carbonate (calcite, chalk or dolomite) or carbonate-containing, like a carbonate-containing sandstone mixed layer, formation.

Advantageously, the treatment fluid is substantially free (e.g., including only about 0.1 to 1% by weight) or entirely free of an additional acid or acid-generating compound, which can cause corrosion and require the use of corrosion inhibitors. Acids and acid-generating compounds were traditionally used to keep the pH of the treatment fluid low to keep the chelating agent protonated and inactivated. According to several exemplary embodiments, the solid acid chelating agent can however, by itself, maintain the desired pH in the treatment fluid. Examples of additional acids include HCl, hydrobromic acid, formic acid, acetic acid, chloroacetic acid, dichloroacetic acid, trichloroacetic acid, and the like. Examples of acid-generating compounds include esters, aliphatic polyesters, orthoesters, poly(orthoesters), poly(lactides), poly(glycolides), poly(e-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and the like.

According to several exemplary embodiments, the treatment fluids and methods are used in fracture acidizing operations of subterranean formations that include a carbonate mineral. According to several exemplary embodiments, the solid acid chelating agent has a small particle size that facilitates its entrance into a fracture where conventional proppants cannot penetrate or access. According to several exemplary embodiments, the treatment fluids and methods are used in matrix acidizing operations of subterranean formations that include a carbonate mineral.

The solid acid chelating agent, in several exemplary embodiments, is present in an amount of about 1% to about 50% by weight of the treatment fluid. In some embodiments, the solid acid chelating agent is present in an amount of about 3% to about 40% by weight of the treatment fluid.

Scale Inhibition Operations

According to several exemplary embodiments, the method of inhibiting formation of scale in a subterranean formation includes providing a treatment fluid containing a solid acid chelating agent, wherein the solid acid chelating agent includes PMIDA, and introducing the treatment fluid into the subterranean formation. The solid acid chelating agent can provide protection against calcium and magnesium scales even in high temperature environments (e.g., about 115° F. and higher) without a coating agent.

Advantageously, the treatment fluid is substantially free (e.g., less than 0.5% by weight) or entirely free of an additional acid or acid-generating compound, which can cause corrosion and require the use of corrosion inhibitors.

According to several exemplary embodiments, the treatment fluids and methods are used in hydraulic fracturing operations. Hydraulic fracturing, or fracing, is used to initiate or stimulate oil or gas production in low-permeability reservoirs. Hydraulic fracturing has become particularly valuable in gas reservoir wells and has been a key factor in unlocking the potential of unconventional gas reservoirs, such as coal-bed methane, tight gas and shale gas reservoirs.

In hydraulic fracturing, a fracturing fluid is injected into a well at such high pressures that the structure "cracks," or fractures. Fracing is used both to open up fractures already present in the formation and to create new fractures. These fractures permit hydrocarbons and other fluids to flow more freely into or out of the well bore. Desirable properties of a hydraulic fracturing fluid may include high viscosity, low fluid loss, low friction during pumping into the well, stability under the conditions of use such as high temperature deep wells, and ease of removal from the fracture and well after the operation is completed.

According to several exemplary embodiments, the solid acid chelating agent is included in a fracturing fluid and is placed in a complex fracture or a series of fractures. The solid acid chelating agent generally has a small particle size and is ductile, which facilitates its transport through fractures created in unconventional reservoirs, such as shales or low permeability reservoirs. For example, the chelating agent is typically micron sized, but can have a nanometer or millimeter-sized particle diameter.

According to several exemplary embodiments, the solid acid chelating agent is placed or incorporated in a proppant pack. Fracturing fluids customarily include a thickened or gelled aqueous solution that has suspended therein "proppant" particles that are substantially insoluble in the fluids of the formation. Proppant particles carried by the fracturing fluid remain in the fracture created, thus propping open the fracture when the fracturing pressure is released and the well is put into production. Suitable proppant materials include sand, walnut shells, sintered bauxite, ceramics, glass or plastic beads, or similar materials. The "propped" fracture provides a larger flow channel to the wellbore through which an increased quantity of hydrocarbons can flow, thereby increasing the production rate of a well.

According to several exemplary embodiments, the solid acid chelating agent is used in gravel packing operations and is placed in a gravel pack. Suitable gravel particulate materials include, but are not limited to, graded walnut or other nut shells, resin-coated walnut or other nut shells, graded sand, resin-coated sand, sintered bauxite, various particulate ceramic materials, glass beads, various particulate polymeric materials and the like. Gravel-packing operations generally include placing a screen in the wellbore and packing the surrounding annulus between the screen and the well bore with gravel of a specific size designed to prevent the passage of formation sand. The screen may include a filter assembly used to retain the gravel placed during the gravel-pack operation. To install the gravel pack, the gravel may be carried to the formation in the form of a slurry by mixing the gravel particulates with the appropriate treatment fluids. The resulting structure presents a barrier to migrating sand from the formation while still permitting fluid flow.

According to several exemplary embodiments, the solid acid chelating agent is used in an amount effective to produce any necessary or desired effect. According to several exemplary embodiments, an effective amount of the chelating agent in the treatment fluid is dependent on one or more conditions present in the system to be treated, as would be understood by one of ordinary skill in the art. The effective amount may be influenced, for example, by factors such as the area subject to deposition, temperature, water quantity, and the respective concentration in the water of the potential scale and deposit forming species. According to several exemplary embodiments, the treatment fluid is effective when the chelating agent is present in an amount of about 1 to 500 ppm of the treatment fluid. In several exemplary embodiments, the chelating agent is present in an amount of about 1 to 200 ppm of the treatment fluid.

Anti-Sludge Operations

According to several exemplary embodiments, the method of reducing formation of sludge in a subterranean formation includes combining a solid acid chelating agent and an aqueous acid solution to form a treatment fluid, wherein the solid acid chelating agent includes PMIDA, and introducing the treatment fluid into a subterranean formation. For example, the solid acid chelating agent can be added to a HCl solution to reduce the sludging tendencies caused by asphaltene precipitation due to the presence of iron. The treatment fluid is not an oil-in-water emulsion or any other type of fluid requiring a non-polar, hydrocarbon phase.

Various kinds and concentrations of aqueous acid solutions can be utilized for carrying out the methods. Commonly used acids include HCl, organic acids, such as citric acid, formic acid, acetic acid, and gluconic acid, and mixtures of such acids. Aqueous solutions of the acids at concentrations of from about 5% to about 28%-30% by weight can be utilized. An about 15% by weight aqueous HCl solution is particularly suitable for use in accordance with several exemplary embodiments of the present invention.

Advantageously, the solid acid chelating agent is in the solid state and can be easily and rapidly mixed with the aqueous acid solution. Typically, anti-sludging additives, due to their viscous nature, are harder to mix and cause a high amount of friction resulting in an increase in pumping pressure. The solid acid chelating agent is solid and can go into solution as it is mixed. The resulting solution has a viscosity near that or substantially similar to water. For example, the solution has a viscosity that is within about 5-10% of the viscosity of water at a given temperature. The solid acid chelating agent has low solubility in water and in aqueous fluid at a pH less than 6, but will dissolve as temperature or pH increases.

According to several exemplary embodiments, the solid acid chelating agent is utilized in an amount of about 0.5 to about 40 pounds per thousand gallons (lb/1000 gal) of the treatment fluid. In several exemplary embodiments, the solid acid chelating agent is present in an amount of about 5% to about 35% (w/v) of the treatment fluid.

According to several exemplary embodiments, the treatment fluids and methods are used in acidizing operations (e.g., fracture acidizing or matrix acidizing) of subterranean formations. A common practice to increase production from a crude oil or gas well involves an acid stimulation treatment of the well. Acid stimulation of a well involves the pumping downhole of an aqueous acid solution which reacts with the subterranean hydrocarbon containing formations, such formations usually consisting of limestone or sand, to increase the size of the pores within the formations and provide enlarged passageways for the crude hydrocarbons to more freely move to collection points which otherwise would be obstructed.

Unfortunately, during such acidizing operations, asphaltene sludges may form, which block the existing and newly formed passageways and reduce the efficacy of the acidizing treatment. The solid acid chelating agent in the treatment fluid can reduce these crude oil sludging tendencies by increasing iron sequestration. In addition, the asphaltenes precipitated and sludge created can be disrupted or dissolved by optimizing the concentration of the solid acid chelating agent in the treatment fluid.

The following examples are illustrative of the compositions and methods discussed above and are not intended to be limiting.

Example 1

Acid Etching Test

Acid etching tests were performed using PMIDA. Solid PMIDA was suspended in a 50 lb/MMgal xanthan gel (gelling agent) and placed in an oven external accumulator cell. A core of winterset carbonate was mounted in a custom designed Hassler core holder with no over burden pressure to ensure the majority of the fluid passed over and/or across the external surface of the core. The cell was heated to 300° F., and the fluid was flowed at 3 mL/min until 400 mL of the fluid had been introduced to the core.

Figure 1:
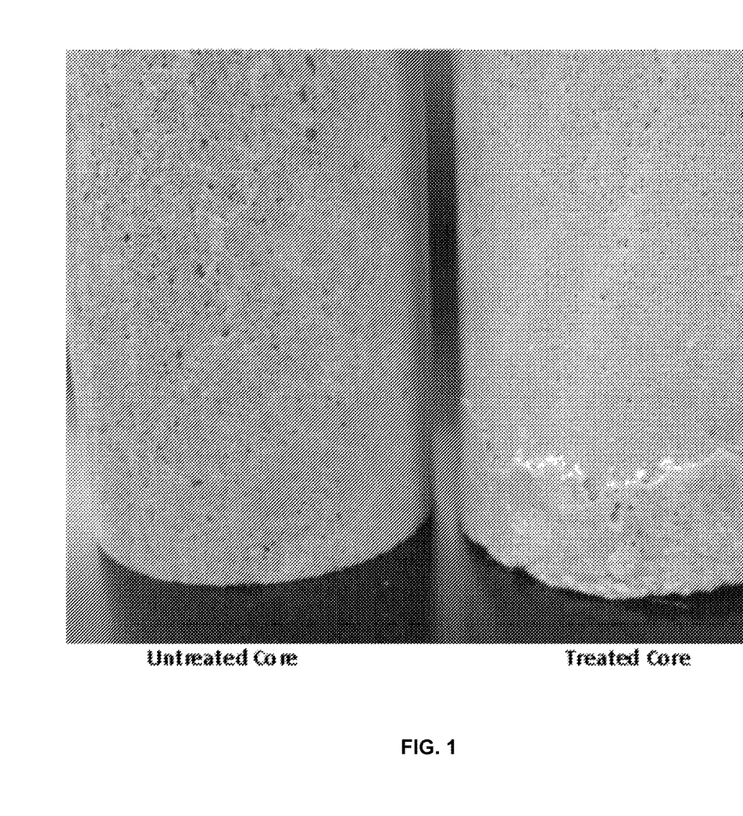
FIG. 1 shows a comparison between a carbonate core treated according to embodiments of the present invention and an untreated carbonate core.

Following cooling, the cell was disassembled, and the core removed. FIG. 1 illustrates an untreated core versus a treated core. As can be seen, the treated core clearly shows the interaction of PMIDA with the carbonate matrix resulting in differential etching of the core.

Example 2

Dynamic Scale Loop Testing

Dynamic scale loop tests were carried out on a high temperature/high pressure Scale Rig 5000™ loop. The test consisted of injecting anion and cation brines individually and at equal rates via two pumps into the system. Each brine passed through a heating coil within an oven, which was set to the required test temperature. Then the brines were mixed at a T-junction and the mixture (scaling brine) flowed into the scaling coil under pressure. This pressure was regulated by use of a pressure relief valve. The pressure difference ($\Delta P$) across the scaling coil was continuously monitored and recorded. As the cations (such as calcium and barium) and anions (such as carbonate and sulfate) reacted and formed scale inside of the scaling coil, brine flow was restricted, which led to an increase in $\Delta P$. First, the scaling time for blank (without inhibitor) was determined. The test period was generally three times the blank time or a minimum 30 minutes.

A PMIDA inhibitor solution was made by adding 0.5 g PMIDA to 500 mL (1000 ppm solution) of the anion brine and adding 2 mL NaOH saturated pH control agent for complete dissolution. In order to determine the minimum effective dose (MED) of PMIDA, the test was repeated with PMIDA dosed at various concentrations. The minimum effective dose (MED) is the minimum concentration required to prevent scale formation over the test period and is specific to test conditions. Such a test is mainly used to obtain a ranking of different chemicals under specific conditions.

The tests were conducted under the following conditions:
Temperature(s): 200° F.
System pressure: 4000 psi
Total brine flow rate: 6 mL/min.
Scaling coil material: Monel
Scaling coil length: 3 meters Table 2 lists the chemical composition of the scaling brine tested.

TABLE 2

| Source | Water Analysis (mg/L) |
|---|---|
| Specific Gravity | 1.186 |
| pH | 7.36 |
| Chloride | 161,109 |
| Sulfate | 270 |
| Bicarbonate (Alkalinity) | 1,200 |
| Aluminum | 4.09 |
| Boron | 336 |
| Barium | 21.6 |
| Calcium | 15,400 |
| Iron | 0.885 |
| Potassium | 5,810 |
| Magnesium | 879 |
| Sodium | 79,400 |
| Strontium | 1,140 |
| TDS | 258,258 |
| TSS (mg/L) | 98 |

Figure 2:
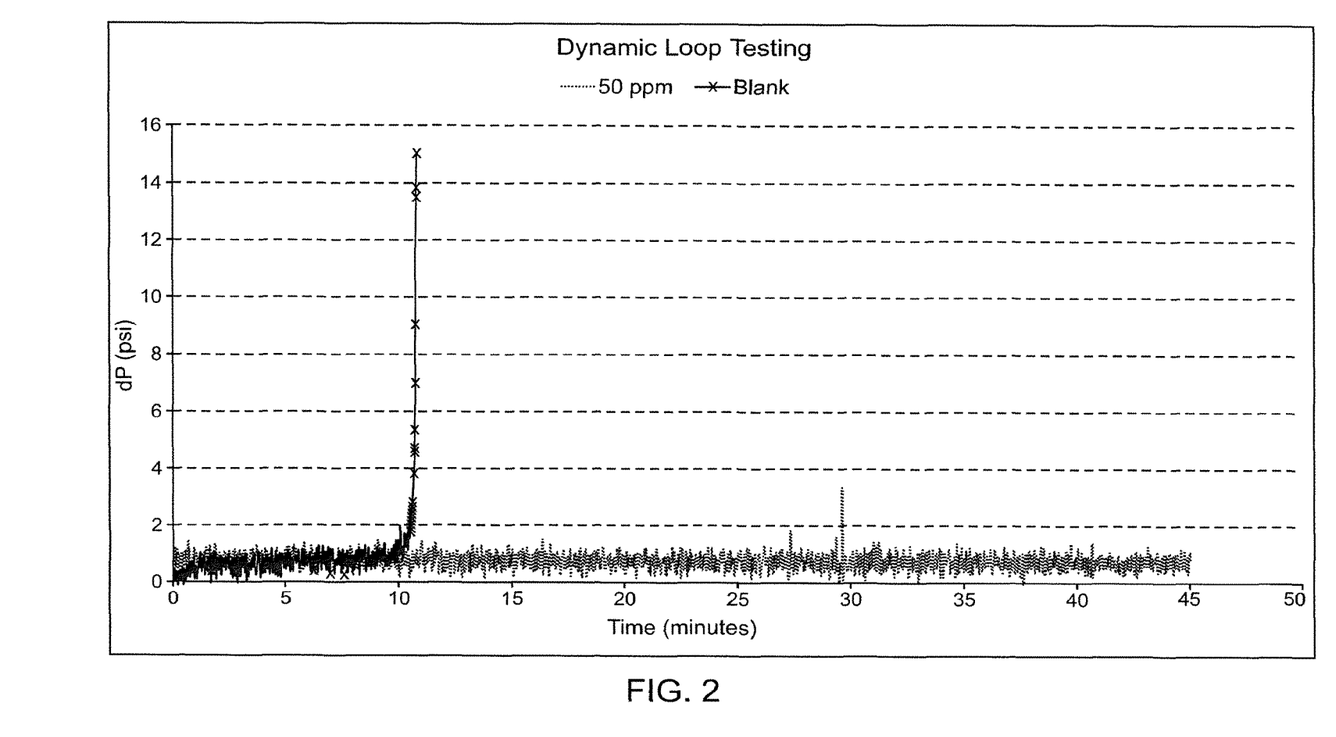
FIG. 2 shows the results of a dynamic scale loop test for a test brine and the test brine with a solid acid chelating agent according to embodiments of the present invention.

At 200° F., 4000 psi system pressure, and a total flow rate of 6 mL/min, the testing proved that the blank scaled in approximately 11 minutes (See FIG. 2). This time was used to determine that the test duration should be at least 33 minutes for scale inhibitor evaluation. The MED of PMIDA against the scaling brine was determined to be 50 ppm under these test conditions. The 25 ppm test failed during its inhibition time under the same conditions for some test runs. FIG. 2 shows the dynamic scale loop test results for the scaling brine with and without PMIDA. As can be seen, even after about 45 minutes, the scaling brine with PMIDA did not scale.

Example 3

Acid/Crude Oil Sludging Determination

Various test fluids were prepared and mixed with crude oil. Test fluid #1 was prepared by adding a ferric chloride ($FeCl_3$) solution and HCl, in that order, to water to produce a 15% HCl solution. Test fluids #2-5 were prepared by adding HCl, PMIDA, and $FeCl_3$ solution, in that order, to water. Test fluid #6 was prepared by adding HCl and ferric ion anti-oxidant (such as ascorbic acid) and $FeCl_3$ solution, in that order, to water. Each test fluid was then thoroughly mixed in a 4 oz shaker bottle. Once each test fluid was mixed, crude oil was added to the aqueous layer, and the cap securely replaced. With the cap in place, a typical acid/crude oil sludging determination was conducted. The qualitative protocol of the test was followed, as opposed to the quantitative. The test fluids, however, were not placed in a water bath after mixing, but left to sit on a counter. Amounts of the various components and the results for each test fluid are provided below in Table 3.

TABLE 3

| Fluid # | PMIDA (g) | Anti-oxidant (g) | HCl[a] (mL) | $H_2O$ (mL) | $FeCl_3$ solution (mL) | Crude Oil (mL) | Total Initial Volume (mL) | Physical Appearance |
|---|---|---|---|---|---|---|---|---|
| 1 | 0.0 | 0.0 | 22.05 | 27.1 | 1 | 50 | 100 | Solidified |
| 2 | 0.12 | 0.0 | 22.05 | 27.1 | 1 | 50 | 100 | Pourable |
| 3 | 0.24 | 0.0 | 22.05 | 27.1 | 1 | 50 | 100 | Pourable |
| 4 | 0.06 | 0.0 | 22.05 | 27.1 | 1 | 50 | 100 | Pourable |
| 5 | 2.4 | 0.0 | 22.05 | 17.1 | 10 | 50 | 100 | Pourable |
| 6 | 0.0 | 0.24 | 22.05 | 27.1 | 1 | 50 | 100 | Solidified |

[a]From 20° Bé Hydrochloric Acid

In test fluids #1 and #6, a dense sludge was formed and solidified the entire blend. The sludge was not pourable even when the bottle was tipped upside down. Test fluids #2-5 produced emulsions that were easily pourable from the jar and showed little to no sludge. Furthermore, test fluids #2-5 were visually liquid and readily flowed out of the jar. There were no solids present within the test fluids.

The test fluids were subsequently filtered through a 100 mesh wire screen to separate any solids that were suspended within the fluid. Test fluids #1 and #6, when finally freed from the jar, produced heavy amounts of sludge that would not pass through the screen. Test fluids #2-5 produced a thick emulsion that passed through the filter screen and produced no visible remnants of sludging within the oil. From the results of Table 3, it can be seen that the test fluids containing PMIDA effectively prevented the formation of sludge.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of reducing viscosifying tendencies of crude oil in a subterranean formation comprising:
   combining an effective amount of a solid acid chelating agent and an aqueous acid solution to form a treatment fluid, wherein the solid acid chelating agent comprises N-phosphonomethyl iminodiacetic acid (PMIDA);
   introducing the treatment fluid into the subterranean formation, wherein the subterranean formation has a bottomhole temperature in excess of 350° F.;
   contacting the crude oil with the treatment fluid; and
   preventing an increase in viscosity of the crude oil.

2. The method of claim 1, wherein the treatment fluid does not comprise an emulsion.

3. The method of claim 1, wherein the treatment fluid has a viscosity substantially similar to water.

4. The method of claim 1, wherein the aqueous acid solution comprises about 15 weight percent hydrochloric acid.

5. The method of claim 1, wherein the solid acid chelating agent is present in an amount of about 0.5 to about 40 pounds per thousand gallons (PPT) of the treatment fluid.

6. The method of claim 1, wherein preventing the increase in viscosity of the crude oil is part of an acidizing or scale control operation.

7. The method of claim 1, wherein the solid acid chelating agent, when ionized, forms a complex with ferric cations.

8. The method of claim 1, wherein the treatment fluid has a pH of less than about 6.

9. The method of claim 1, wherein the treatment fluid has a pH of less than about 3.5.

10. The method of claim 1, wherein the solid acid chelating agent is in solid form when the treatment fluid is introduced into the subterranean formation.

11. The method of claim 1, wherein the crude oil comprises asphaltenes.

12. The method of claim 1, wherein the treatment fluid comprises about 5 percent to about 35 percent (w/v) of the solid acid chelating agent.

* * * * *